United States Patent
Lim et al.

(10) Patent No.: US 12,069,280 B2
(45) Date of Patent: *Aug. 20, 2024

(54) METHOD AND APPARATUS FOR ESTIMATING OPTICAL FLOW FOR MOTION COMPENSATION

(71) Applicant: SK TELECOM CO., LTD., Seoul (KR)

(72) Inventors: Jeong-yeon Lim, Seoul (KR); Hyo Song Kim, Seoul (KR); Se-hoon Son, Seoul (KR); Jae-seob Shin, Seoul (KR); Sun-young Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 231 days.

This patent is subject to a terminal disclaimer.

(21) Appl. No.: 17/673,879

(22) Filed: Feb. 17, 2022

(65) Prior Publication Data

US 2022/0174292 A1    Jun. 2, 2022

Related U.S. Application Data

(63) Continuation of application No. 16/608,020, filed as application No. PCT/KR2018/003044 on Mar. 15, 2018, now Pat. No. 11,272,193.

(30) Foreign Application Priority Data

Apr. 24, 2017  (KR) .................. 10-2017-0052290
Jun. 19, 2017  (KR) .................. 10-2017-0077246

(51) Int. Cl.
  *H04N 19/176*  (2014.01)
  *H04N 19/105*  (2014.01)
  *H04N 19/577*  (2014.01)

(52) U.S. Cl.
  CPC ......... *H04N 19/176* (2014.11); *H04N 19/105* (2014.11); *H04N 19/577* (2014.11)

(58) Field of Classification Search
  CPC .. H04N 19/103; H04N 19/105; H04N 19/176; H04N 19/182; H04N 19/52; H04N 19/543; H04N 19/56; H04N 19/57; H04N 19/573; H04N 19/577; H04N 19/96
  USPC ..................................................... 375/240.16
  See application file for complete search history.

(56) References Cited

U.S. PATENT DOCUMENTS

| 8,712,095 B2 | 4/2014 | Gaddy |
| 11,272,193 B2 * | 3/2022 | Lim ............ H04N 19/176 |
| 2011/0286635 A1 | 11/2011 | Nishigaki |
| 2012/0134416 A1 | 5/2012 | Lin et al. |

(Continued)

FOREIGN PATENT DOCUMENTS

| CN | 103688543 A | 3/2014 |
| CN | 105847804 A | 8/2016 |

OTHER PUBLICATIONS

Chinese Office Action issued on Sep. 5, 2022, in connection with the Chinese Patent Application No. 201880034013.7, 19 pages.

(Continued)

*Primary Examiner* — Behrooz M Senfi
(74) *Attorney, Agent, or Firm* — Hauptman Ham, LLP

(57) ABSTRACT

Disclosed herein is a method for adaptive bidirectional optical flow estimation for inter prediction compensation during video encoding. The method aims to reduce complexity and/or cost of bidirectional optical flow (BIO) at a pixel level or a subblock level.

3 Claims, 18 Drawing Sheets

(56) References Cited

U.S. PATENT DOCUMENTS

| | | | |
|---|---|---|---|
| 2012/0328003 A1 | 12/2012 | Chien et al. | |
| 2013/0182779 A1 | 7/2013 | Lim et al. | |
| 2014/0112392 A1 | 4/2014 | Lim et al. | |
| 2016/0219302 A1 | 7/2016 | Liu et al. | |
| 2017/0041632 A1 | 2/2017 | Hepper | |
| 2017/0091894 A1 | 3/2017 | Eldar | |
| 2017/0094305 A1* | 3/2017 | Li | H04N 19/136 |
| 2017/0337711 A1 | 11/2017 | Ratner et al. | |
| 2018/0192072 A1* | 7/2018 | Chen | H04N 19/119 |
| 2018/0262773 A1 | 9/2018 | Chuang et al. | |
| 2018/0352228 A1* | 12/2018 | Francois | H04N 19/186 |
| 2019/0141333 A1* | 5/2019 | Lee | H04N 19/105 |
| 2019/0320199 A1* | 10/2019 | Chen | H04N 19/105 |

OTHER PUBLICATIONS

Alshina, E. et al., Bi-directional optical flow, Joint Collaborative Team on Video Coding (JCT-VC) of ITU-T SG16 WP3 and ISO/IEC JTC1/SC29/WG11, Oct. 7-15, 2010, p. 1-5, 3rd Meeting, Samsung Electronics Co., Ltd., Guangzhou, China.

Alshina, E. et al., Known tools performance investigation for next generation video coding, ITU—Telecommunications Standardization Sector Study Group 16 Question 6, Jun. 19-26, 2015, 52nd Meeting, Video Coding Experts Group (VCEG), Warsaw, Poland.

International Search Report dated Jun. 8, 2018, in connection with International Patent Application No. PCT/KR2018/003044.

Liu et al., Two-pass Bi-directional Optical Flow Via Motion Vector Refinement (Year: 2019).

Li et al., Co-located reference frame interpolation using optical flow estimation for video compression (Year: 2018).

\* cited by examiner (a) plus (M=1)

(b) plus (M=2)

(c) diamond (M=1)

(d) diamond (M=2)

|   |   |   |   |   |   |   |   |
|---|---|---|---|---|---|---|---|
| 1 | 2 | 3 | 4 | 4 | 3 | 2 | 1 |
| 2 | 4 | 6 | 8 | 8 | 6 | 4 | 2 |
| 3 | 6 | 9 | 12 | 12 | 9 | 6 | 3 |
| 4 | 8 | 12 | 16 | 16 | 12 | 8 | 4 |
| 4 | 8 | 12 | 16 | 16 | 12 | 8 | 4 |
| 3 | 6 | 9 | 12 | 12 | 9 | 6 | 3 |
| 2 | 4 | 6 | 8 | 8 | 6 | 4 | 2 |
| 1 | 2 | 3 | 4 | 4 | 3 | 2 | 1 |

|   |   |   |   |
|---|---|---|---|
| 9 | 12 | 12 | 9 |
| 12 | 16 | 16 | 12 |
| 12 | 16 | 16 | 12 |
| 9 | 12 | 12 | 9 |

| 0 | 0 | 0  | 0  | 0  | 0  | 0 | 0 |
|---|---|----|----|----|----|---|---|
| 0 | 0 | 0  | 0  | 0  | 0  | 0 | 0 |
| 0 | 0 | 9  | 12 | 12 | 9  | 6 | 3 |
| 0 | 0 | 12 | 16 | 16 | 12 | 8 | 4 |
| 0 | 0 | 12 | 16 | 16 | 12 | 8 | 4 |
| 0 | 0 | 9  | 12 | 12 | 9  | 6 | 3 |
| 0 | 0 | 6  | 8  | 8  | 6  | 4 | 2 |
| 0 | 0 | 3  | 4  | 4  | 3  | 2 | 1 |

METHOD AND APPARATUS FOR ESTIMATING OPTICAL FLOW FOR MOTION COMPENSATION

CROSS REFERENCE TO RELATED APPLICATION

This present application is a continuation of U.S. patent application Ser. No. 16/608,020, filed on Oct. 24, 2019, which is a national stage filing under 35 U.S.C § 371 of PCT application number PCT/KR2018/003044 filed on Mar. 15, 2018 which is based upon and claims the benefit of priority to Korean Patent Application No. 10-2017-0052290 filed on Apr. 24, 2017, and Korean Patent Application No. 10-2017-0077246, filed on Jun. 19, 2017 in the Korean Intellectual Property Office. The disclosures of the above-listed applications are hereby incorporated by reference herein in their entirety.

TECHNICAL FIELD

The present disclosure relates to video encoding or decoding. More specifically, the present disclosure relates to a method for adaptive bidirectional optical flow estimation for inter prediction compensation during video encoding.

BACKGROUND

The statements in this section merely provide background information related to the present disclosure and may not constitute prior art.

In video encoding, compression is performed using data redundancy in both spatial and temporal dimensions. Spatial redundancy is greatly reduced by transform coding. Temporal redundancy is reduced through predictive coding. Observing that the time correlation is maximized along the motion trajectory, prediction for motion compensation is used for this purpose. In this context, the main purpose of motion estimation is not to find "real" motion in the scene, but to maximize compression efficiency. In other words, the motion vector must provide accurate prediction of a signal. In addition, since motion information must be transmitted as overhead in a compressed bitstream, it must enable a compressed representation. Efficient motion estimation is important in achieving high compression in video encoding.

Motion is an important source of information in video sequences. Motion occurs not only because of movement of an object but also because of movement of the camera. Apparent motion, also known as optical flow, captures spatio-temporal variations in pixel intensity in an image sequence.

Bidirectional Optical Flow (BIO) is a motion estimation/compensation technique disclosed in JCTVC-C204 and VCEG-AZ05, which derives sample-level motion refinement based on the assumptions of optical flow and steady motion. The bidirectional optical flow estimation method currently under discussion enables fine refinement of motion vector information, which is an advantage, but requires much higher computational complexity than conventional bidirectional prediction for fine correction of motion vector information, which is a disadvantage.

Non-Patent Document 1: JCTVC-C204 (E. Alshina, et al., Bi-directional optical flow, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010)

Non-Patent Document 2: VCEG-AZ05 (E. Alshina, et al., Known tools performance investigation for next generation video coding, ITU-T SG 16 Question 6, Video Coding Experts Group (VCEG), 52nd Meeting: 19-26 Jun. 2015, Warsaw, Poland)

SUMMARY

Technical Problem

It is an object of the present disclosure to reduce complexity and/or cost of bidirectional optical flow (BIO).

Technical Solution

In accordance with one aspect of the present disclosure, provided is a method for encoding or decoding video data, including determining a first motion vector indicating a first corresponding region most similar to a current block in a first reference picture, and a second motion vector indicating a second corresponding region most similar to the current block in a second reference picture; generating a prediction block for the current block by applying a bidirectional optical flow (BIO) process in a subblock unit; and reconstructing the current block using the generated prediction block. Herein, the generating of the prediction block includes determining a BIO motion vector for each subblock constituting the current block; and generating a prediction value of pixels constituting a corresponding subblock based on the determined BIO motion vector.

In accordance with another aspect of the present invention, provided is an apparatus for decoding video data, including a memory; and one or more processors, wherein the one or more processors are configured to perform operations of determining a first motion vector indicating a first corresponding region most similar to a current block in a first reference picture, and a second motion vector indicating a second corresponding region most similar to the current block in a second reference picture; generating a prediction block for the current block by applying a bidirectional optical flow (BIO) process in a subblock unit; and reconstructing pixels of the current block using the generated prediction block. Herein, the generating of the prediction block includes determining a BIO motion vector for each subblock constituting the current block; and generating a prediction value of pixels constituting a corresponding subblock based on the determined BIO motion vector.

The BIO motion vector $(v_x, v_y)$ may be determined as a vector that minimizes the sum of squares of the flow differences for the respective pixels located in a search region defined by a predetermined masking window centered on each pixel in the subblock. Alternatively, the BIO motion vector $(v_x, v_y)$ may be determined as a vector that minimizes the sum of squares of the flow differences for all pixels located in the search region defined by a predetermined masking window centered on some pixels in the subblock. For example, the positions of the pixels to which the masking window is applied and the pixels to which the masking window is not applied may form a check pattern, a pattern of horizontal stripes, or a pattern of vertical stripes.

In some embodiments, instead of repeatedly calculating the flow differences, a repeated difference value may be weighted according to the number of repetitions of the difference value. In some examples, in determining the BIO motion vector for a subblock located at the edge of the current block, flow differences for pixels located in an area outside the current block may not be considered.

In some embodiments, a masking window may not be used. For example, the BIO motion vector ($v_x$, $v_y$) may be determined as a vector that minimizes the sum of squares of the flow differences for the respective pixels in the subblock.

In accordance with another aspect of the present invention, provided is a method for decoding video data, including determining a first motion vector indicating a first corresponding region most similar to a current block in a first reference picture, and a second motion vector indicating a second corresponding region most similar to the current block in a second reference picture; generating a prediction block for the current block by applying a bidirectional optical flow (BIO) process in a pixel unit; and reconstructing pixels of the current block using the generated prediction block, wherein the generating of the prediction block includes determining a BIO motion vector for each pixel constituting the current block, wherein the BIO motion vector is determined as a vector that minimizes a sum of squares of flow differences obtained for all masking pixels located in a masking window of a plus shape or a diamond shape centered on a corresponding pixel; and generating a prediction value of the corresponding pixel based on the determined BIO motion vector.

In accordance with another aspect of the present invention, provided is an apparatus for decoding video data, including a memory; and one or more processors, wherein the one or more processors are configured to perform operations of determining a first motion vector indicating a first corresponding region most similar to a current block in a first reference picture, and a second motion vector indicating a second corresponding region most similar to the current block in a second reference picture; generating a prediction block for the current block by applying a bidirectional optical flow (BIO) process in a pixel unit; and reconstructing pixels of the current block using the generated prediction block. Herein, the generating of the prediction block includes determining a BIO motion vector for each pixel constituting the current block, wherein the BIO motion vector is determined as a vector that minimizes a sum of squares of flow differences obtained for all masking pixels located in a masking window of a plus shape or a diamond shape centered on a corresponding pixel; and generating a prediction value of the corresponding pixel based on the determined BIO motion vector.

BRIEF DESCRIPTION OF DRAWINGS

FIG. 10B is a diagram exemplarily showing weights of respective pixel positions of difference values used in determining a subblock-level BIO motion vector.

FIG. 15 is a diagram illustrating an example of weighting of each pixel in a subblock according to a seventh embodiment.

FIG. 16B is a diagram exemplarily showing weights of difference values by pixel position used in determining a BIO motion vector for a 4×4 subblock located at a top left corner of a 16×16 current block.

DETAILED DESCRIPTION

Figure 1:
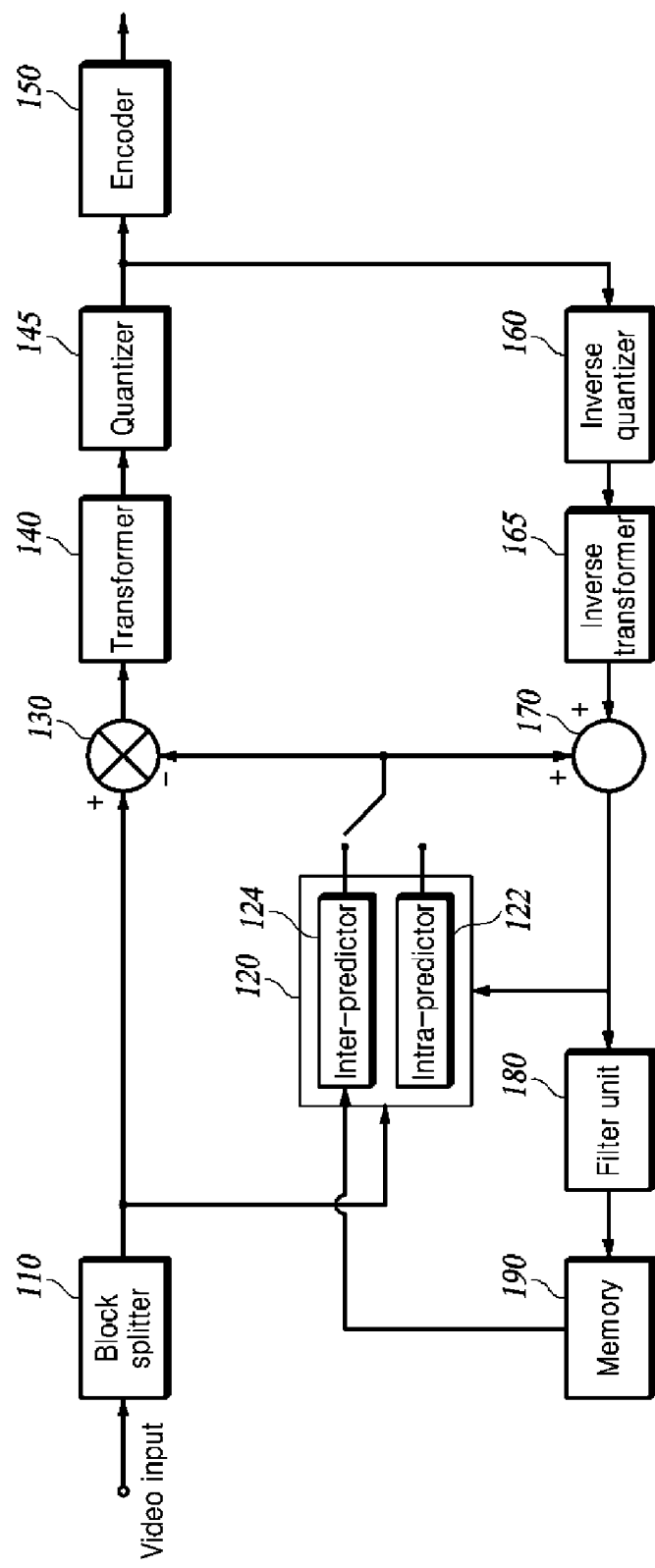
FIG. 1 is an exemplary block diagram of a video encoding apparatus capable of implementing techniques of the present disclosure.

Hereinafter, some embodiments of the present invention will be described in detail with reference to the accompanying drawings. It should be noted that, in adding reference numerals to the constituent elements in the respective drawings, like reference numerals designate like elements, although the elements are shown in different drawings. Further, in the following description of the present invention, a detailed description of known functions and configurations incorporated herein will be omitted when it may make the subject matter of the present invention rather unclear.

The techniques of the present disclosure generally relate to reducing complexity and/or cost of a bidirectional optical flow (BIO) technique. BIO may be applied during motion compensation. In general, BIO is used to calculate a motion vector for each pixel in the current block through an optical flow, and to update a prediction value located at a corresponding pixel based on the calculated motion vector value for each pixel.

FIG. 1 is an exemplary block diagram of a video encoding apparatus capable of implementing techniques of the present disclosure.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190. Each element of the video encoding apparatus may be implemented as a hardware chip, or may be implemented as software, and the microprocessor may be implemented to execute the functions of the software corresponding to the respective elements.

The block splitter 110 splits each picture constituting video into a plurality of coding tree units (CTUs), and then recursively splits the CTUs using a tree structure. A leaf node in the tree structure is a coding unit (CU), which is a basic unit of coding. A QuadTree (QT) structure, in which a node (or a parent node) is split into four sub-nodes (or child nodes) of the same size, or a QuadTree plus BinaryTree (QTBT) structure combining the QT structure and a BinaryTree (BT) structure, in which a node is split into two sub-nodes, may be used as the tree structure. That is, QTBT may be used to split the CTU into multiple CUs.

In the QuadTree plus BinaryTree (QTBT) structure, a CTU can be first split according to the QT structure. The quadtree splitting may be repeated until the size of the splitting block reaches the minimum block size MinQTSize of the leaf node allowed in QT. If the leaf node of the QT is not greater than the maximum block size MaxBTSize of the root node allowed in the BT, it may be further partitioned into a BT structure. The BT may have a plurality of split types. For example, in some examples, there may be two splitting types, which are a type of horizontally splitting a block of a node into two blocks of the same size (i.e., symmetric horizontal splitting) and a type of vertically splitting a block of a node into two blocks of the same size (i.e., symmetric vertical splitting). Further, there may be a splitting type of splitting a block of a node into two blocks in an asymmetric form. The asymmetric splitting may include splitting a block of a node into two rectangular blocks at a size ratio of 1:3, or splitting a block of a node in a diagonal direction.

The splitting information generated by the block splitter 110 by splitting the CTU by the QTBT structure is encoded by the encoder 150 and transmitted to the video decoding apparatus.

Hereinafter, a block corresponding to a CU (i.e., a leaf node of the QTBT) to be encoded or decoded is referred to as a "current block."

The predictor 120 generates a prediction block by predicting a current block. The predictor 120 includes an intra-predictor 122 and an inter-predictor 124.

In general, current blocks within a picture may each be predictively coded. In general, prediction of the current blocks may be accomplished using an intra-prediction technique, which uses data from a picture containing the current blocks, or an inter-prediction technique, which uses data from a picture previously coded for a picture containing the current blocks. Inter-prediction includes both unidirectional prediction and bidirectional prediction.

For each inter-predicted block, a motion information set may be available. A set of motion information may include motion information about the forward and backward prediction directions. Here, the forward and backward prediction directions are two prediction directions in a bidirectional prediction mode, and the terms "forward direction" and "backward direction" do not necessarily have a geometric meaning. Instead, they generally correspond to whether to display a reference picture before ("backward direction") or after ("forward direction") the current picture. In some examples, the "forward" and "backward" prediction directions may correspond to reference picture list 0 (RefPicList0) and reference picture list 1 (RefPicList1) of the current picture.

For each prediction direction, the motion information includes a reference index and a motion vector. The reference index may be used to identify the reference picture in the current reference picture list (RefPicList0 or RefPicList1). The motion vector has a horizontal component x and a vertical component y. In general, the horizontal component represents horizontal displacement in the reference picture relative to the position of the current blocks in the current picture, which is needed to locate the x coordinate of the reference block. The vertical component represents a vertical displacement in the reference picture relative to the position of the current blocks, which is needed to locate the y coordinate of the reference block.

The inter-predictor 124 searches for a block most similar to the current block in a reference picture encoded and decoded earlier than the current picture, and generates a prediction block for the current block using the searched block. Then, the inter-predictor generates a motion vector corresponding to a displacement between the current block in the current picture and the prediction block in the reference picture. In general, motion estimation is performed on a luma component, and a motion vector calculated based on the luma component is used for both the luma component and the chroma component. The motion information including the information about the reference picture and a motion vector used to predict the current block is encoded by the encoder 150 and transmitted to the video decoding apparatus.

Examples of the present disclosure generally relate to a bidirectional optical flow (BIO) technique. Certain techniques of the present disclosure may be carried out by the inter-predictor 124. For example, the inter-predictor 124 may carry out the techniques of the present disclosure described below with reference to FIGS. 4 to 13. In other words, after determining bidirectional motion vectors for the current block, the inter-predictor 124 may generate a prediction block for the current block using the motion compensation according to the BIO technique on an image pixel basis or a subblock basis. In other examples, one or more other components of the encoding apparatus may be additionally involved in carrying out the techniques of the present disclosure. In addition, since there is an explicit equation for calculating a motion vector, there is no necessity for a search operation for acquiring motion information and signaling for transmitting the motion information.

Various methods may be used to minimize the number of bits required to encode motion information.

For example, when the reference picture and the motion vector of the current block are the same as the reference picture and the motion vector of a neighboring block, the motion information about the current block may be transmitted to the decoding apparatus by encoding information for identifying the neighboring block. This method is called a "merge mode."

In the merge mode, the inter-predictor 124 selects a predetermined number of merge candidate blocks (hereinafter referred to as "merge candidates") from among the neighboring blocks of the current block.

Figure 2:
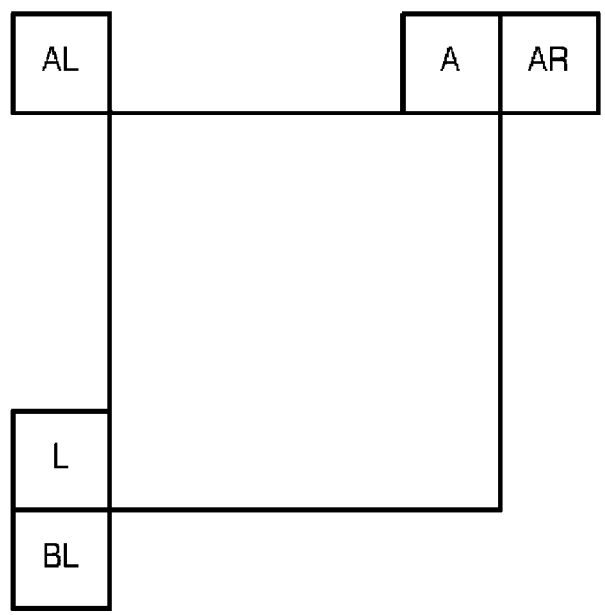
FIG. 2 is an exemplary diagram of neighboring blocks of a current block.

As illustrated in FIG. 2, as neighboring blocks for deriving merge candidates, all or part of a left block L, an above block A, an above right block AR, a bottom left block BL, and an above left block AL which are adjacent to the current block in the current picture may be used. In addition, a block located within a reference picture (which may be the same as or different from the reference picture used to predict the current block) other than the current picture in which the current block is located may be used as a merge candidate. For example, a co-located block which is at the same position as the current block or blocks adjacent to the block at the same position in the reference picture may also be used as merge candidates.

The inter-predictor 124 configures a merge list including a predetermined number of merge candidates using such neighboring blocks. Merge candidates to be used as the motion information about the current block are selected from among the merge candidates included in the merge list, and merge index information for identifying the selected candidates is generated. The generated merge index information is encoded by the encoder 150 and transmitted to the decoding apparatus.

Another method of encoding the motion information is to encode motion vector differences.

In this method, the inter-predictor 124 derives predictive motion vector candidates for a motion vector of the current block, using neighboring blocks of the current block. As neighboring blocks used to derive the predictive motion vector candidates, all or part of a left block L, an above block A, an above right block AR, a bottom left block BL, and an above left block AL which are adjacent to the current block in the current picture shown in FIG. 2 may be used. In addition, blocks located within a reference picture (which may be the same as or different from the reference picture used to predict the current block) other than the current picture in which the current block is located may be used as the neighboring blocks used to derive the predictive motion vector candidates. For example, a co-located block which is at the same position as the current block or blocks adjacent to the block at the same position in the reference picture may also be used as merge candidates.

The inter-predictor 124 derives predictive motion vector candidates using the motion vectors of the neighboring blocks, and determines a predictive motion vector for the motion vector of the current block using the predictive motion vector candidates. Then, a motion vector difference is calculated by subtracting the predictive motion vector from the motion vector of the current block.

The predictive motion vector may be obtained by applying a predefined function (e.g., a function for calculating a median, an average, or the like) to the predictive motion vector candidates. In this case, the video decoding apparatus also knows the predefined function. In addition, since the neighboring blocks used to derive the predictive motion vector candidates have already been encoded and decoded, the video decoding apparatus already knows the motion vectors of the neighboring blocks as well. Accordingly, the video encoding apparatus does not need to encode information for identifying the predictive motion vector candidates. Therefore, in this case, the information about the motion vector difference and the information about the reference picture used to predict the current block are encoded.

The predictive motion vector may be determined by selecting any one of the predictive motion vector candidates. In this case, information for identifying the selected predictive motion vector candidate is further encoded along with the information about the motion vector difference and the information about the reference picture used to predict the current block.

The intra-predictor 122 predicts pixels in the current block using pixels (reference pixels) located around the current block in the current picture in which the current block is included. There is a plurality of intra-prediction modes according to the prediction directions, and the peripheral pixels and the equation to be used are defined differently according to each prediction mode. In particular, the intra-predictor 122 may determine an intra-prediction mode to be used in encoding the current block. In some examples, the intra-predictor 122 may encode the current block using several intra-prediction modes and select an appropriate intra-prediction mode to use from among the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using a neighboring pixel (reference pixel) and an equation determined according to the selected intra-prediction mode. Information about the selected intra-prediction mode is encoded by the encoder 150 and transmitted to the video decoding apparatus.

The subtractor 130 subtracts the prediction block generated by the intra-predictor 122 or the inter-predictor 124 from the current block to generate a residual block.

The transformer 140 transforms residual signals in the residual block having pixel values in the spatial domain into transform coefficients in the frequency domain. The transformer 140 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 145 quantizes the transform coefficients output from the transformer 140 and outputs the quantized transform coefficients to the encoder 150.

The encoder 150 encodes the quantized transform coefficients using a coding scheme such as CABAC to generate a bitstream. The encoder 150 encodes information such as a CTU size, a MinQTSize, a MaxBTSize, a MaxBTDepth, a MinBTSize, a QT split flag, a BT split flag, and a split type, which are associated with the block split, such that the video decoding apparatus splits the block in the same manner as in the video encoding apparatus.

The encoder 150 encodes information about a prediction type indicating whether the current block is encoded by intra-prediction or inter-prediction, and encodes intra-prediction information or inter-prediction information according to the prediction type.

When the current block is intra-predicted, a syntax element for the intra-prediction mode is encoded as intra-prediction information. When the current block is inter-predicted, the encoder 150 encodes a syntax element for inter-prediction information. The syntax element for inter-prediction information includes the following information:

(1) Mode information indicating whether motion information about the current block is encoded in a merge mode or a mode for encoding a motion vector difference (2) Syntax element for motion information When motion information is encoded in the merge mode, the encoder 150 may encode merge index information indicating a merge candidate selected as a candidate for extracting motion information about the current block from among the merge candidates as a syntax element for the motion information.

On the other hand, when the motion information is encoded in the mode for encoding the motion vector difference, the information about the motion vector difference and the information about the reference picture are encoded as syntax elements for the motion information. When the predictive motion vector is determined in a manner of selecting one of a plurality of predictive motion vector candidates, the syntax element for the motion information further includes predictive motion vector identification information for identifying the selected candidate.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference samples in performing intra-prediction of the next block in order.

The filter unit 180 deblock-filters the boundaries between the reconstructed blocks in order to remove blocking artifacts caused by block-by-block encoding/decoding and stores the blocks in the memory 190. When all the blocks in one picture are reconstructed, the reconstructed picture is used as a reference picture for inter-prediction of a block in a subsequent picture to be encoded.

Hereinafter, a video decoding apparatus will be described.

Figure 3:
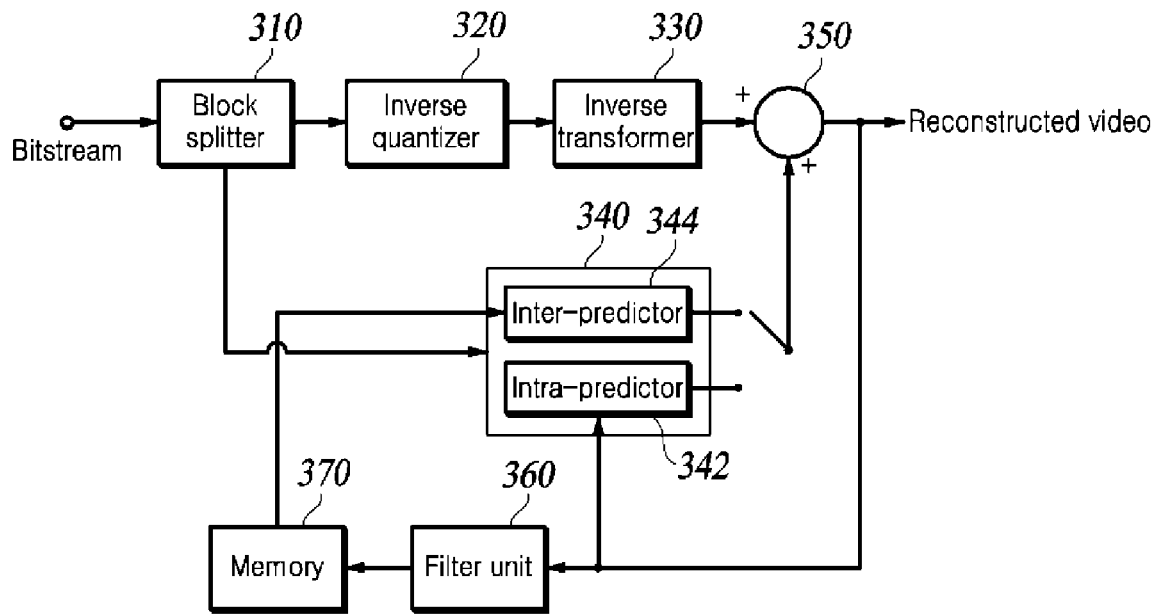
FIG. 3 is an exemplary block diagram of a video decoding apparatus capable of implementing techniques of the present disclosure.

FIG. 3 is an exemplary block diagram of a video decoding apparatus capable of implementing techniques of the present disclosure.

The video decoding apparatus includes a decoder 310, an inverse quantizer 320, an inverse transformer 330, a predictor 340, an adder 350, a filter unit 360, and a memory 370. As in the case of the video encoding apparatus of FIG. 2, each element of the video encoding apparatus may be implemented as a hardware chip, or may be implemented as software, and the microprocessor may be implemented to execute the functions of the software corresponding to the respective elements.

The decoder 310 decodes a bitstream received from the video encoding apparatus, extracts information related to block splitting to determine a current block to be decoded, and extracts prediction information necessary to reconstruct the current block and information about a residual signal.

The decoder 310 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node, of a tree structure, and extracts splitting information about the CTU to split the CTU using the tree structure. For example, when the CTU is split using a QTBT structure, a first flag (QT_split_flag) related to splitting of the QT is extracted to split each node into four nodes of a sub-layer. For a node corresponding to the leaf node of the QT, a second flag (BT_split_flag) and the split type information related to splitting of the BT are extracted to split the leaf node into a BT structure.

Upon determining a current block to be decoded through splitting of the tree structure, the decoder 310 extracts information about the prediction type indicating whether the current block is intra-predicted or inter-predicted.

When the prediction type information indicates intra-prediction, the decoder 310 extracts a syntax element for the intra-prediction information (intra-prediction mode) about the current block.

When the prediction type information indicates inter-prediction, the decoder 310 extracts a syntax element for the inter-prediction information. First, the decoder extracts mode information indicating an encoding mode in which the motion information about the current block is encoded among a plurality of encoding modes. Here, the plurality of encoding modes includes a merge mode including a skip mode and a motion vector difference encoding mode. When the mode information indicates the merge mode, the decoder 310 extracts merge index information indicating a merge candidate from which the motion vector of the current block is to be derived as a syntax element for the motion information among the merge candidates. On the other hand, when the mode information indicates the motion vector difference encoding mode, the decoder 310 extracts the information about the motion vector difference and the information about the reference picture to which the motion vector of the current block refers as syntax elements for the motion vector. When the video encoding apparatus uses one of the plurality of predictive motion vector candidates as a predictive motion vector of the current block, the predictive motion vector identification information is included in the bitstream. Therefore, in this case, not only the information about the motion vector difference and the reference picture but also the predictive motion vector identification information is extracted as a syntax element for the motion vector.

The decoder 310 extracts information about the quantized transform coefficients of the current block as information about the residual signal.

The inverse quantizer 320 inversely quantizes the quantized transform coefficients. The inverse transformer 330 inversely transforms the inversely quantized transform coefficients from the frequency domain to the spatial domain to reconstruct the residual signals, and thereby generates a residual block for the current block.

The predictor 340 includes an intra-predictor 342 and an inter-predictor 344. The intra-predictor 342 is activated when the prediction type of the current block is intra-prediction, and the inter-predictor 344 is activated when the prediction type of the current block is inter-prediction.

The intra-predictor 342 determines an intra-prediction mode of the current block among the plurality of intra-prediction modes from the syntax element for the intra-prediction mode extracted from the decoder 310, and predicts the current block using reference pixels around the current block according to the intra-prediction mode.

The inter-predictor 344 determines motion information about the current block using the syntax element of the intra-prediction mode extracted from the decoder 310, and predicts the current block using the determined motion information.

First, the inter-predictor 344 checks the mode information for inter-prediction extracted from the decoder 310. When the mode information indicates the merge mode, the inter-predictor 344 configures a merge list including a predetermined number of merge candidates using neighboring blocks of the current block. The inter-predictor 344 configures the merge list in the same way as in the case of the inter-predictor 124 of the video encoding apparatus. Then, one merge candidate is selected from among the merge candidates in the merge list using the merge index information transmitted from the decoder 310. The motion information about the selected merge candidate, that is, the motion vector and the reference picture of the merge candidate, is set as a motion vector and a reference picture of the current block.

On the other hand, when the mode information indicates the motion vector difference encoding mode, the inter-predictor 344 derives predictive motion vector candidates using the motion vectors of the neighboring blocks of the current block, and determines a predictive motion vector for the motion vector of the current block using the predictive motion vector candidates. The inter-predictor 344 derives the predictive motion vector candidates in the same manner as in the case of the inter-predictor 124 of the video encoding apparatus. In the case where the video encoding apparatus uses one of the plurality of predictive motion vector candidates as the predictive motion vector of the current block, the syntax element for the motion information includes predictive motion vector identification information. Therefore, in this case, the inter-predictor 344 may select a candidate indicated by the predictive motion vector identification information among the predictive motion vector candidates as the predictive motion vector. However, when the video encoding apparatus determines the predictive motion vector using a function predefined for the plurality of predictive motion vector candidates, the inter-predictor may determine the predictive motion vector using the same function as used by the video encoding apparatus. Once the predictive motion vector of the current block is determined, the inter-predictor 344 adds the predictive motion vector and the motion vector difference transmitted from the decoder 310 to determine the motion vector of the current block. The reference picture referred to by the motion vector of the current block is determined using the information about the reference picture delivered from the decoder 310.

When the motion vector and the reference picture of the current block are determined in the merge mode or the motion vector difference encoding mode, the inter-predictor 342 generates a prediction block for the current block using a block at the position indicated by the motion vector in the reference picture.

Examples of the present disclosure generally relate to a bidirectional optical flow (BIO) technique. The predetermined techniques of the present disclosure may be carried out by the inter-predictor 344. For example, the inter-predictor 344 may carry out the techniques of the present disclosure described below with reference to FIGS. 4 to 13. In other words, the inter-predictor 124 may generate a prediction block for the current block using the motion compensation according to the BIO technique on an image pixel basis or a subblock basis. In other examples, one or more other components of the decoding apparatus may be additionally involved in carrying out the techniques of the present disclosure.

The adder 350 adds the residual block output from the inverse transformer and the prediction block output from the inter-predictor or intra-predictor to reconstruct the current block. The pixels in the reconstructed current block are utilized as reference samples for intra-prediction of a block to be decoded later.

The filter unit 360 deblock-filters the boundaries between the reconstructed blocks in order to remove blocking artifacts caused by block-by-block decoding and stores the deblock-filtered blocks in the memory 370. When all the blocks in one picture are reconstructed, the reconstructed picture is used as a reference picture for inter-prediction of blocks in a subsequent picture to be decoded.

The present disclosure relates to using a bidirectional optical flow (BIO) estimation technique for refining motion vector information obtained through inter-prediction. The encoding apparatus performs motion estimation and compensation in a coding unit (CU) in an inter prediction operation, and then transmits a resulting motion vector (MV) value to the decoding apparatus. The encoding apparatus and the decoding apparatus may further refine the MV value in a pixel unit or a subblock unit (i.e., sub-CU) smaller than the CU using the BIO. That is, the BIO may precisely compensate for motion of the coding block CU in a 1×1 block (that is, pixel) unit from the n×n block based on the size of each block. In addition, since there is an explicit equation for calculating a motion vector, a search operation for acquiring motion information and signaling for transmitting the motion information are not required.

Figure 4:
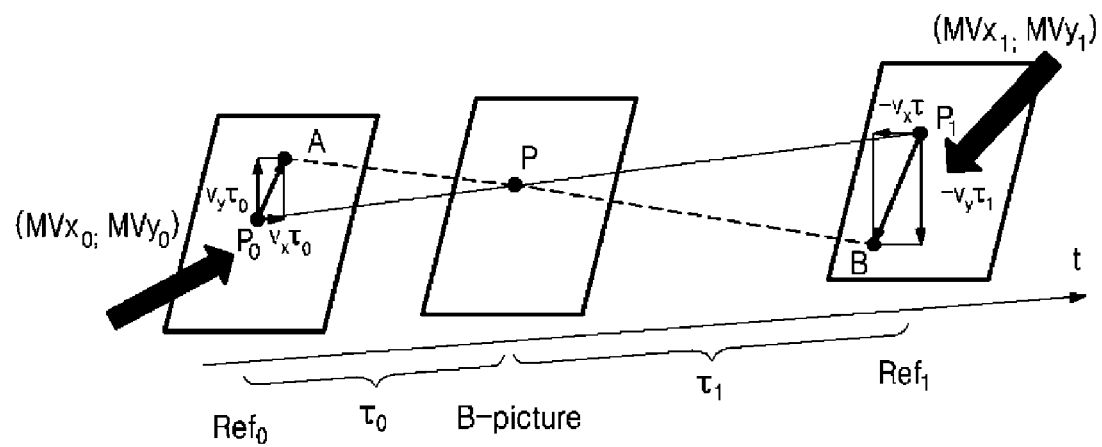
FIG. 4 is a reference diagram for explaining the basic concept of BIO.

FIG. 4 is a reference diagram for explaining the basic concept of BIO.

The BIO used for video encoding and decoding is based on the assumptions that the motion vector information should be bidirectional (or bi-prediction) information, and that the motion is a steady motion moving sequentially on the time axis. FIG. 4 shows a current picture (B-picture) referencing two reference pictures $Ref_0$ and $Ref_1$.

First, suppose that bidirectional motion vectors $MV_0$ and $MV_1$ have been determined by (normal) bidirectional motion prediction for the current block to be encoded in the current picture, in which $MV_0$ and $MV_1$ indicate corresponding regions (i.e., reference blocks), within the reference pictures $Ref_0$ and $Ref_1$, most similar to the current block. The two bidirectional motion vectors have values representing the motion of the current block. That is, the values are obtained by setting the current block as one unit and estimating and compensating for the motion for the unit as a whole.

In the example of FIG. 4, $P_0$ is a pixel in the reference picture $Ref_0$ indicated by the motion vector $MV_0$ to correspond to pixel P in the current block, and $P_1$ is a pixel in the reference picture $Ref_1$ indicated by the motion vector $MV_1$ to correspond to pixel P in the current block. Further, suppose that motion for pixel P in FIG. 4 is slightly different from the overall motion of the current block. For example, when an object located at pixel A in $Ref_0$ of FIG. 4 moves to pixel B in $Ref_1$ via pixel P in current block of the current picture, pixel A and pixel B may have values quite similar to each other. Also, in this case, the point in $Ref_0$ most similar to pixel P in the current block is not $P_0$ indicated by the motion vector $MV_0$, but pixel A which has moved $P_0$ by a predetermined displacement vector $(v_x\tau_0, v_y\tau_0)$. The point in $Ref_1$ most similar to pixel P in the current block is not $P_1$ indicated by the motion vector $MV_1$, but pixel B which has moved $P_1$ by a predetermined displacement vector $(-v_x\tau_1, -v_y\tau_1)$. Hereinafter, for simplicity, $(v_x, v_y)$ is referred to as a "BIO motion vector."

Therefore, in predicting the value of pixel P of the current block in the current picture, using the values of two reference pixels A and B enables more accurate prediction than using reference pixels $P_0$ and $P_1$ indicated by the bidirectional motion vectors $MV_0$ and $MV_1$. The concept of changing the reference pixels used to predict one pixel of the current block in consideration of pixel-level motion within the current block specified by the BIO motion vector $(v_x, v_y)$ as described above may be extended to subblocks within the current block.

Hereinafter, a theoretical method for generating a prediction value for a pixel in a current block according to the BIO technique will be described. For simplicity, it is assumed that BIO-based bidirectional motion compensation is performed on a pixel basis.

It is assumed that bidirectional motion vectors $MV_0$ and $MV_1$ by (normal) bi-directional motion prediction for the current block to be encoded in the current picture, in which $MV_0$ and $MV_1$ indicate corresponding regions (i.e., reference blocks), within the reference pictures $Ref_0$ and $Ref_1$, most similar to the current block encoded in the current picture. The decoding apparatus may generate the bi-directional motion vectors $MV_0$ and $MV_1$ from the motion vector information included in the bitstream. In addition, the luminance value of a pixel within the reference picture $Ref_0$ indicated by the motion vectors $MV_0$ to correspond to the pixel (i, j) within the current block is defined as $I_{(0)}(i, j)$, and the luminance value of a pixel within the reference picture $Ref_1$ indicated by the motion vectors $MV_1$ to correspond to the pixel (i, j) within the current block is defined as $I^{(1)}(i, j)$.

The luminance value of pixel A within the reference picture $Ref_0$ indicated by the BIO motion vector $(v_x, v_y)$ to correspond to a pixel in the current block may be defined as $I^{(0)}+v_x\tau_0\partial I^{(0)}/\partial x+v_y\tau_0\partial I^{(0)}/\partial y$, and the luminance value of pixel B in the reference picture $Ref_1$ may be defined as $I^{(1)}-v_x\tau_1\partial I^{(1)}/\partial x-v_y\tau_1\partial I^{(1)}/\partial y$. Therefore, the flow difference $\Delta$ between pixel A and pixel B is generally defined as Equation 1 below.

$$\Delta=(I^{(0)}-I^{(1)}+v_x(\tau_1\partial I^{(1)}/\partial x+\tau_0\partial I^{(0)}/\partial x)+v_y(\tau_1\partial I^{(1)}/\partial y+\tau_0\partial I^{(0)}/\partial y)) \quad \text{[Equation 1]}$$

Here, $I^{(k)}$ (k=0, 1) denotes the luminance of the pixels within the reference pictures $Ref_0$ and $Ref_1$ indicated by the motion vectors $MV_0$ and $MV_1$ to correspond to a pixel to be predicted within the current block. $(v_x, v_y)$ is a BIO motion vector to be calculated. For simplicity, the positions (i, j) of the pixels within the reference pictures $Ref_0$ and $Ref_1$ are omitted from the respective terms of Equation 1 above. $\partial I^{(k)}/\partial x$ and $\partial I^{(k)}/\partial y$ denote the horizontal and vertical components of the $I^{(k)}$ gradient, respectively. $\tau_0$ and $\tau_1$ denote temporal distances between the current picture and the two reference pictures $Ref_0$ and $Ref_1$. $\tau_0$ and $\tau_1$ may be calculated based on a picture order count (POC). For example, $\tau_0$=POC (current)−POC($Ref_0$) and $\tau_1$=POC($Ref_1$)−POC(current). Here, POC(current), POC($Ref_0$), and POC($Ref_1$) denote the POCs of the current picture, the reference picture $Ref_0$, and the reference picture $Ref_1$, respectively.

Based on the assumption that the motion is locally consistent with the surrounding pixels, the BIO motion vector for the current pixel (i, j) to be predicted considers differences $\Delta$ in Equation 1 for all pixels (i', j') present in a certain region $\Omega$ around the current pixel (i, j) to be predicted. That is, the BIO motion vector for the current pixel (i, j) may be determined as a vector that yields a minimum sum of squares of the differences $\Delta[i', j']$ obtained for the respective pixels in the certain region $\Omega$, as shown in Equation 2.

$$(v_x, v_y) = \underset{v_x,v_y}{\mathrm{argmax}} \sum_{[i',j']\in\Omega} \Delta^2[i', j'] \quad \text{[Equation 2]}$$

Here, (i', j') denotes all pixels located in the search region $\Omega$. Since the BIO motion vector $(v_x, v_y)$ of the current pixel may be determined by calculating an explicit equation like Equation 2 that minimizes an objective function (sum of $\Delta^2$) at the position of the current pixel, there is no necessity for a search operation for acquiring detailed motion information and signaling for transmitting the motion information.

In general, the search region $\Omega$ may be defined as a masking window having a size of (2M+1)×(2N+1) centered on the current pixel (i, j). The structure and size of the masking window greatly influence complexity and precision of the algorithm for determining the BIO motion vector $(v_x, v_y)$. Therefore, selecting a masking window is very important to the algorithm for determining the BIO motion vector $(v_x, v_y)$.

When the BIO motion vector $(v_x, v_y)$ of the current pixel is determined, the bidirectional prediction value $pred_{BIO}$ based on the BIO motion vector for the current pixel (i, j) may be calculated by Equation 3 below.

$$pred_{BIO}=\frac{1}{2}\cdot(I^{(0)}+I^{(1)}+v_x\cdot(\tau_0\partial I^{(0)}/\partial x-\tau_1\partial I^{(1)}/\partial x)+v_y\cdot(\tau_0\partial I^{(0)}/\partial y-\tau_1\partial I^{(1)}/\partial y)) \quad \text{[Equation 3]}$$

In Equation 3, $(I^{(0)}+I^{(1)})/2$ is typical bi-directional prediction compensation, and therefore the remaining terms may be referred to as a BIO offset.

Hereinafter, a BIO-based bidirectional motion compensation method will be described with reference to FIGS. 5A and 5B. The method described below is common to the video encoding apparatus and the video decoding apparatus. Although not shown in FIG. 5, it is assumed that the encoding apparatus has encoded and decoded pictures to be used as reference pictures, and stored the pictures in a memory. It is also assumed that the decoding apparatus has decoded the pictures to be used as reference pictures and stored the pictures in a memory.

Figure 5A:
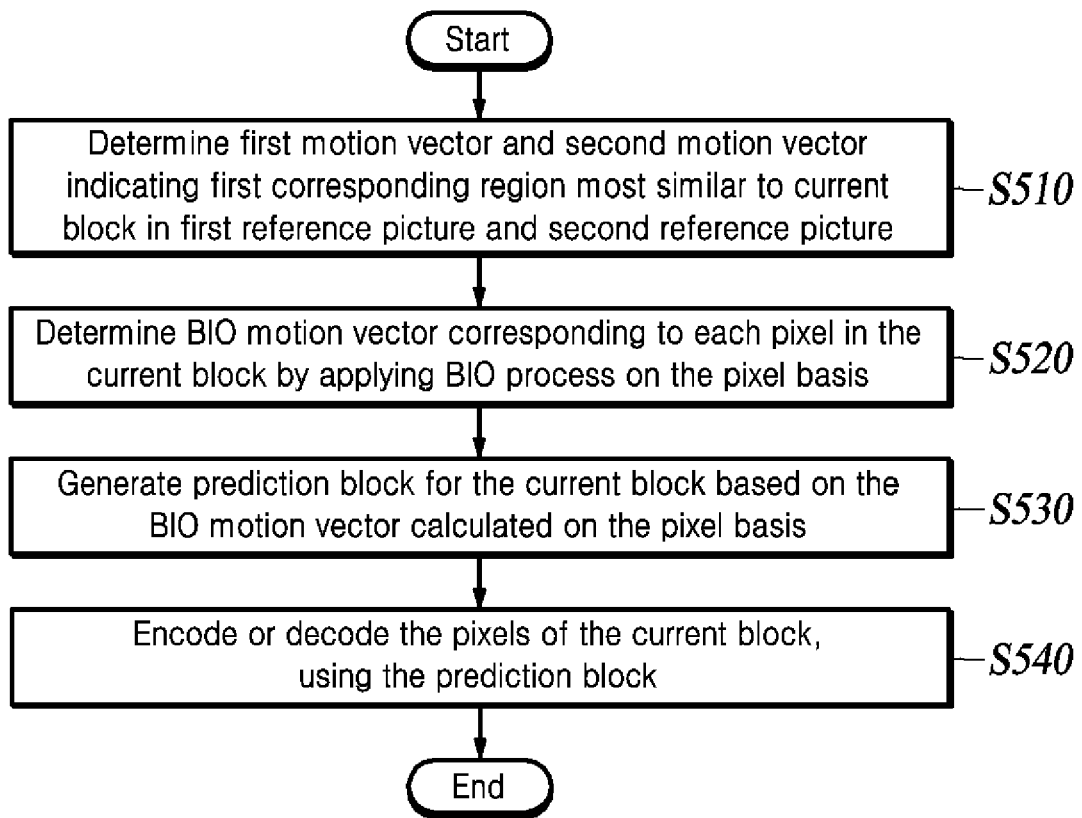
FIG. 5A is a flowchart illustrating a method for bidirectional motion compensation performed based on pixel level BIO according to an embodiment of the present disclosure.

FIG. 5A is a flowchart illustrating a method for bidirectional motion compensation performed based on pixel-level BIO according to an embodiment of the present disclosure.

First, the encoding apparatus and the decoding apparatus determine a first motion vector indicating a first corresponding region most similar to the current block in a first reference picture, and determine a second motion vector indicating a second corresponding region most similar to the current block in a second reference picture (S510).

The encoding apparatus and the decoding apparatus determine a respective BIO motion vector $(v_x, v_y)$ corresponding to each subject pixel in the current block by applying a BIO process on a pixel basis (S520).

The BIO motion vector $(v_x, v_y)$ may be determined as a vector that minimizes the sum of squares of the flow differences (i.e., Equation 2) for the respective pixels (i', j') located in a search region defined by a predefined masking window that is centered on the corresponding subject pixel (i, j).

In some examples, in determining the BIO motion vector for a pixel located at the edge of the current block, flow differences for pixels located in an area outside the current block may not be considered.

In some examples, a rectangular masking window having a (2M+1)×(2N+1) size may be used. Preferably, for example, a square-shaped masking window having a 5×5 size may be used. In some other examples, a masking window that has a non-square shape such as a plus shape or diamond shape may be used.

The encoding apparatus and the decoding apparatus generate a prediction block for the current block using bidirectional prediction based on the BIO motion vectors $(v_x, v_y)$ calculated on a pixel basis (S530). That is, the encoding apparatus and the decoding apparatus generate the bidirectional prediction values of the subject pixels based on Equation 3, using the respective BIO motion vectors.

Finally, the encoding apparatus and the decoding apparatus encode or decode the current block, using the generated prediction block (S540).

Figure 5B:
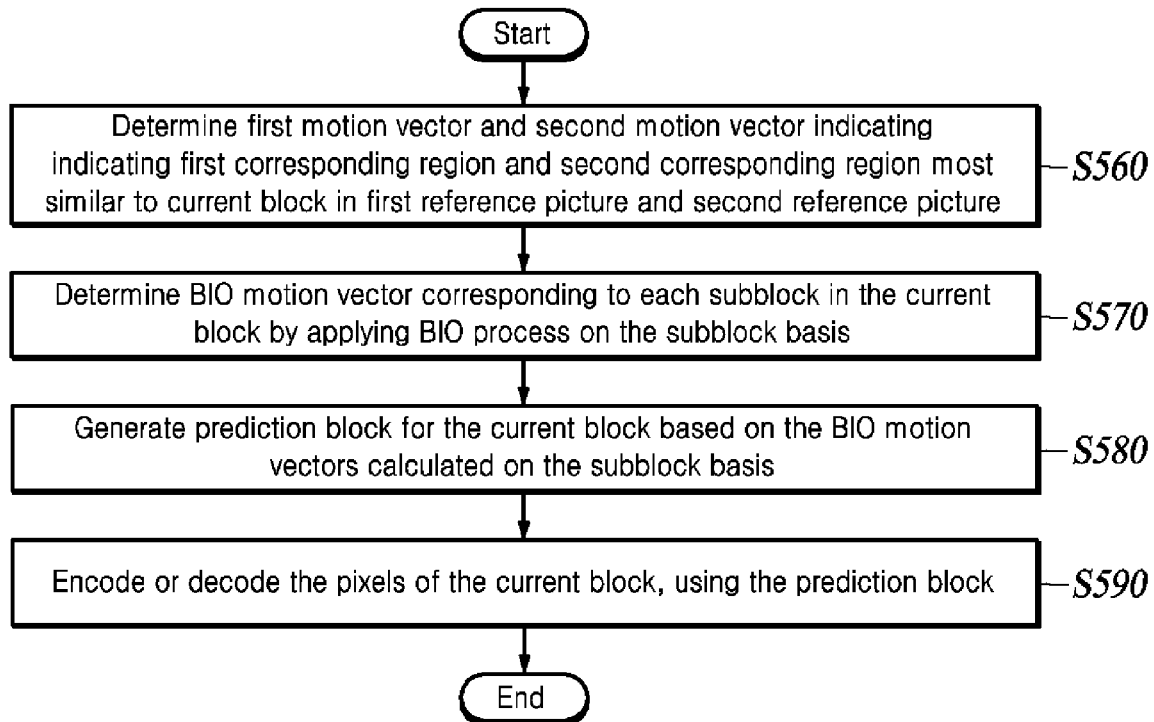
FIG. 5B is a flowchart illustrating a method for bidirectional motion compensation performed based on BIO of a subblock level according to an embodiment of the present disclosure.

FIG. 5B is a flowchart illustrating a method for bidirectional motion compensation performed based on subblock-level BIO according to an embodiment of the present disclosure.

First, the encoding apparatus and the decoding apparatus determine a first motion vector indicating a first corresponding region most similar to the current block in a first reference picture, and determine a second motion vector indicating a second corresponding region most similar to the current block in a second reference picture (S560).

The encoding apparatus and the decoding apparatus determine a respective BIO motion vector ($v_x$, $v_y$) corresponding to each subblock within the current block by applying the BIO process on a subblock basis (S570).

The BIO motion vector ($v_x$, $v_y$) may be determined as a vector that minimizes the sum of squares of the flow differences (i.e., Equation 2) for the pixels (i', j') located in a respective search region defined by a predefined masking window centered on each pixel (i, j) within the subblock. Alternatively, the BIO motion vector ($v_x$, $v_y$) may be determined as a vector that minimizes the sum of squares of the flow differences for the pixels (i', j') located in the respective search region defined by a predefined masking window centered on some pixels (i, j) within the subblock. For example, the positions of the pixels to which the masking window is applied and the pixels to which the masking window is not applied may form a check pattern, a pattern of horizontal stripes, or a pattern of vertical stripes.

In some embodiments, instead of repeatedly calculating the flow differences, a repeated difference value may be weighted according to the number of repetitions of the difference value. In some examples, in determining the BIO motion vector for a subblock located at the edge of the current block, flow differences for pixels located in an area outside the current block may not be considered.

In some embodiments, a rectangular masking window having a (2M+1)×(2N+1) size may be used. In some embodiments, the masking window may have a square shape (of, for example, a 5×5 size). In some other embodiments, a masking window that has a non-square shape such as a plus shape or diamond shape may be used. In some embodiments, a masking window may not be used. For example, the BIO motion vector ($v_x$, $v_y$) may be determined as a vector that minimizes the sum of squares of the flow differences for the respective pixels in the subblock.

The encoding apparatus and the decoding apparatus generate a prediction block for the current block using bidirectional prediction based on the BIO motion vectors ($v_x$, $v_y$) calculated on a subblock basis (S580). All pixels in the subblock share the BIO motion vector ($v_x$, $v_y$) calculated on the subblock basis. That is, the BIO-based prediction values for all the pixels in the subject subblock are calculated by Equation 3 using one BIO motion vector ($v_x$, $v_y$) determined for the subject subblock.

Finally, the encoding apparatus and the decoding apparatus encode or decode the current block, using the generated prediction block (S590).

In some embodiments of the present disclosure, the BIO is applied on a pixel-level basis. In some other embodiments, the BIO is applied on a block-level basis. Hereinafter, embodiments of the pixel-level BIO process will be described first, and then embodiments of the block-level BIO process will be described.

In first and second embodiments described below, the BIO is applied on the pixel-level basis. The masking window used in the BIO process may have a (2M+1)×(2N+1) size and be centered on the current pixel (i, j). For simplicity, in the following description, it is assumed that the width and height of the masking window are equal to each other (i.e., M=N). In generating a prediction block of the current block, the pixel-level BIO obtains a BIO motion vector at the pixel level and generates a bidirectional prediction value at the pixel level based on the obtained BIO motion vector.

First Embodiment

Figure 6:
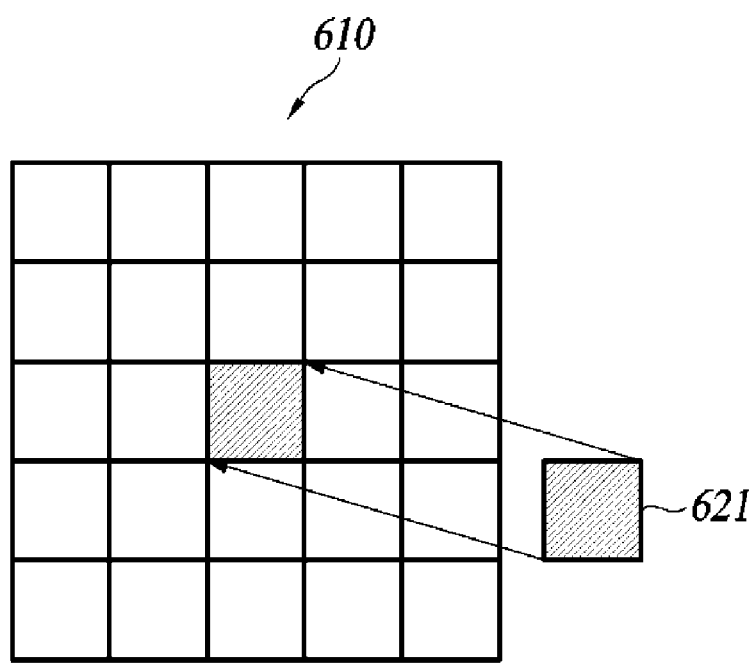
FIG. 6 is a diagram illustrating a 5×5 masking window and a 1×1 block of a current block which are used for BIO-based motion compensation according to a first embodiment.

In this embodiment, a rectangular masking window is used to calculate the BIO motion vector at the pixel level. In this embodiment, the total number of differences Δ required to determine the BIO motion vector of the pixel to be predicted will be described with reference to FIG. 6. FIG. 6 illustrates a 5×5 masking window 610 and a pixel 621 to be predicted in the current block. One pixel 621 to be predicted in the current block is the center of a masking window 610 indicated by hatching in FIG. 6, and the number of pixels located within the masking window 610 including the pixel 621 to be predicted is 25 in total. Therefore, the number of differences Δ required to determine the BIO motion vectors ($v_x$, $v_y$) for the pixel 621 to be predicted in the current block is 25. Finally, the BIO motion vector ($v_x$, $v_y$) for the pixel to be predicted is estimated by substituting the 25 differences Δ into Equation 2. Once the BIO motion vector (($v_x$, $v_y$) is determined based on the optical flow, the bidirectional prediction value for the subject pixel of the current block is calculated by Equation 3. This process is repeatedly applied to each pixel in the current block to produce prediction values of all the pixels constituting the prediction block for the current block.

However, in determining the BIO motion vector for a pixel located at the edge of the current block, flow differences for pixels located in an area outside the current block may not be considered even if the pixels are included in the masking window.

Second Embodiment

Figure 7:
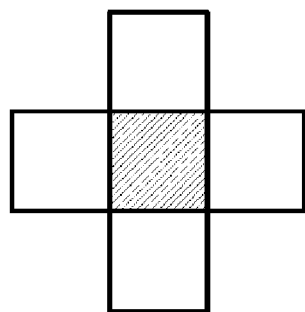
FIG. 7 is a diagram illustrating non-rectangular masking windows that may be used to determine a pixel level BIO motion vector according to a second embodiment.
Figure 7:
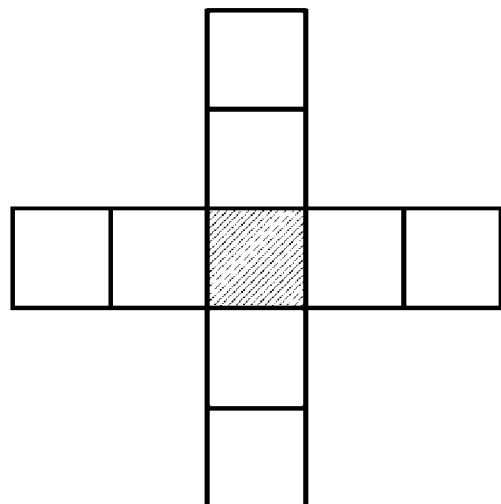
Figure 7:
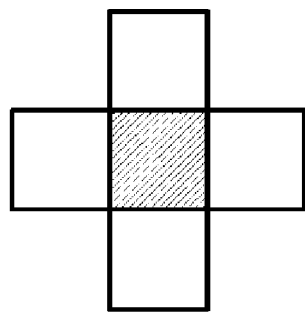
Figure 7:
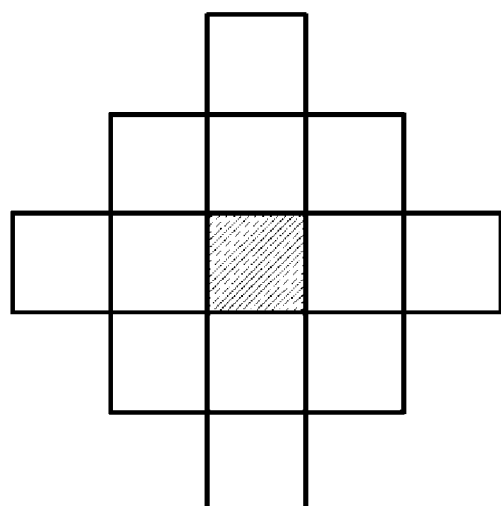

FIG. 7 is a diagram illustrating non-rectangular masking windows used for BIO-based motion compensation according to a second embodiment.

Unlike the first embodiment, which uses a square-shaped masking window, this embodiment employs masking windows of various shapes. In FIG. 7, two types of masking windows (i.e., masking windows having a plus shape and a diamond shape) are presented, but the present disclosure does not exclude use of masking windows of any shapes other than the rectangular masking window. Use of such masking windows reduces complexity taken to process all the pixels in the square-shaped masking window used in the first embodiment. As illustrated in FIG. 7, the size of the plus-shaped and diamond-shaped masking windows may be scaled depending on the value of parameter M.

In this embodiment, the total number of differences Δ required to determine the BIO motion vector of a subblock will be described with reference to FIG. 8.

Figure 8:
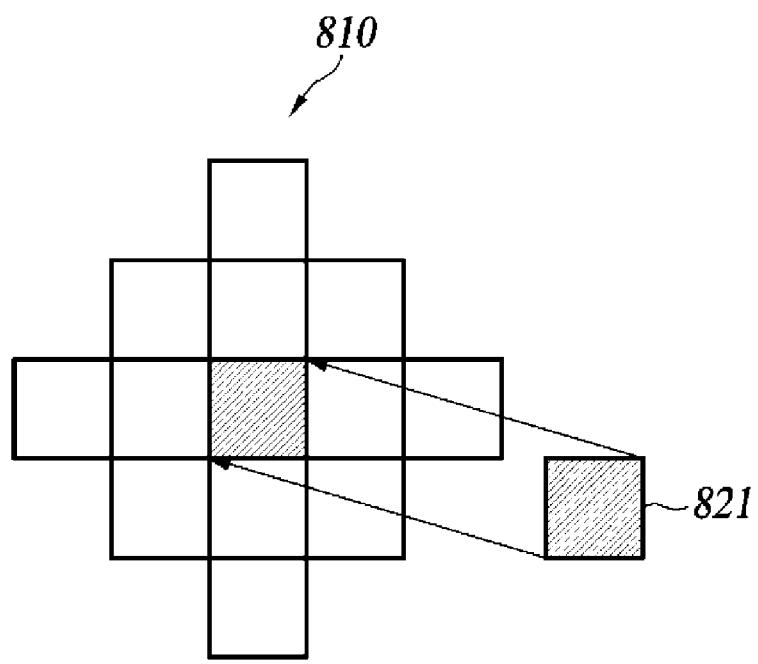
FIG. 8 is a diagram illustrating a diamond-shaped masking window and a 1×1 block of a current block which are used to determine a pixel-level BIO motion vector according to a second embodiment.

FIG. 8 illustrates a diamond-shaped masking window 810 having M=2 and a pixel 821 to be predicted in the current block. One pixel 821 to be predicted in the current block is the center of the masking window 810 indicated by hatching in FIG. 8, and the number of pixels within the masking window 810 including the pixel 821 to be predicted is 13 in total. Therefore, the number of differences Δ required to determine the BIO motion vectors ($v_x$, $v_y$) for the pixel 821 to be predicted in the current block is 13. Finally, the BIO motion vector ($v_x$, $v_y$) for the pixel 821 to be predicted is estimated by substituting the 13 differences Δ into Equation 2. In this embodiment, these processes are performed for every pixel in the current block to calculate a BIO motion vector corresponding to each pixel.

However, in determining the BIO motion vector for a pixel located at the edge of the current block, flow differences for pixels located in an area outside the current block may not be considered even if the pixels are included in the masking window.

In third to eighth embodiments described below, BIO-based motion compensation is applied at the block-level. In a subblock-level BIO motion compensation process, the subblock size may be M×N (where M and N are integers). All pixels in the M×N subblock share a BIO motion vector ($v_x$, $v_y$) calculated on a subblock-level basis. That is, bidirectional prediction based on optical flow for all pixels in the M×N subblock is calculated by Equation 3 using the calculated BIO motion vector ($v_x$, $v_y$). Although the methods of the present disclosure do not limit the size of the subblock, it should be noted that the BIO process is described based on a 4×4 subblock in the following embodiments for simplicity.

Third Embodiment

In this embodiment, to determine one BIO motion vector for a subblock, a rectangular masking window centered on each pixel in the subblock is applied to each pixel, and the difference Δ of Equation 1 is estimated for each of the pixels located within the masking window. Finally, these differences are substituted into Equation 2 to estimate the BIO motion vector corresponding to the subblock.

Figure 9:
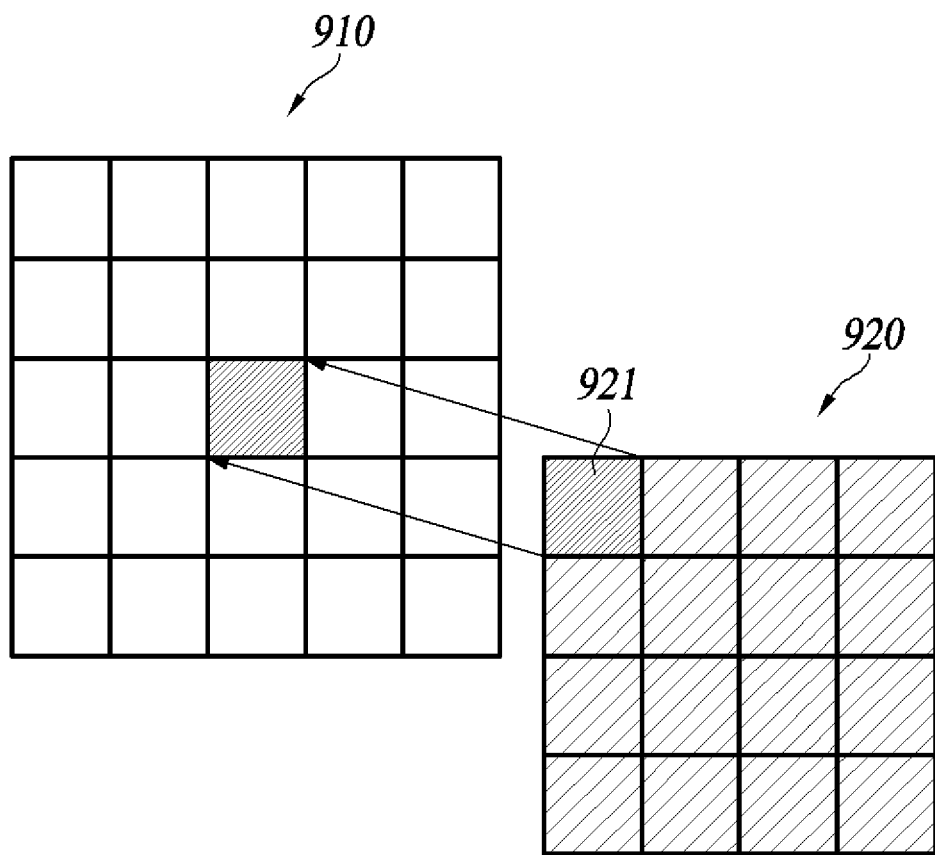
FIG. 9 is a diagram illustrating a 5×5 masking window and a 4×4 subblock which are used to determine a subblock-level BIO motion vector according to a third embodiment.

FIG. 9 illustrates an example of a 5×5 masking window 910 and a 4×4 subblock 920 according to an example of the scheme proposed in this embodiment. The masking window 910 illustrated in FIG. 9 has a square shape with M=2. The current pixel (i, j) 921 in the subblock 920 is the center of the masking window 910, which corresponds to the hatched portion of FIG. 9. The total number of pixels in the masking window 910 for one pixel (i, j) of the subblock is 25 (=(2M+1)×(2M+1)=5×5). Therefore, the total number of differences required to determine the BIO motion vector for the 4×4 subblock amounts to 400 (=16×25) based on the size of the subblock and the size of the masking window. The BIO motion vector for the subblock is determined as a vector that minimizes the sum of squares of these differences.

Figure 10A:
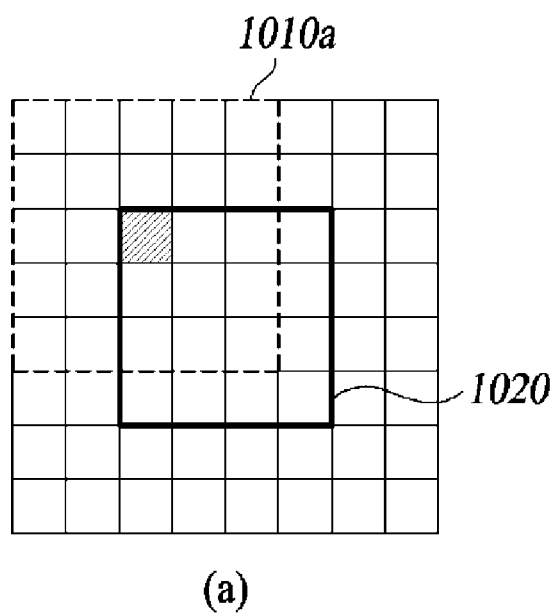
FIG. 10A is a diagram for explaining that difference values used in determining a BIO motion vector at a subblock level are calculated in an overlapping manner.
Figure 10A:
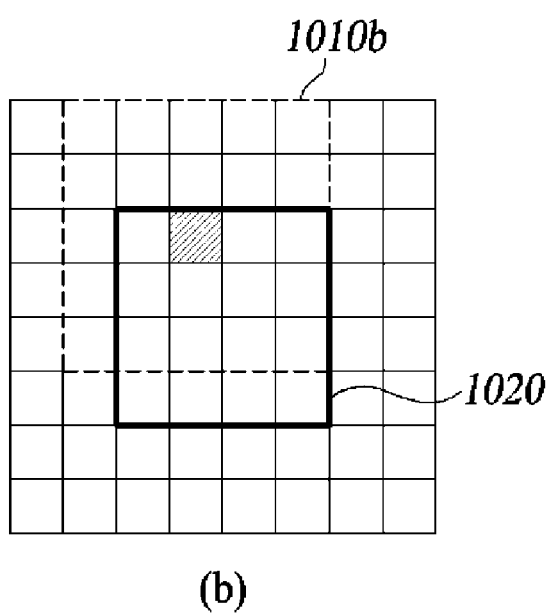

It should be noted that, among the 400 differences, the remaining differences except 64 distinct differences are in the form of repetition of the 64 differences. For example, as shown in FIG. 10A, most of the pixels located in a masking window 1010a centered on a pixel at position (0, 0) of a subblock 1020 are also located within a masking window 1010b centered on a pixel at position (1, 0) of the subblock 1020. Accordingly, instead of repeatedly calculating overlapping difference values, the calculation of Equation 2 may be simplified by assigning a weight to an overlapping difference according to the number of overlaps. For example, when a 5×5 masking window is applied to a 4×4 subblock, 64 distinct differences are calculated in total, and then each of the differences may be assigned a corresponding weight. Then, a BIO motion vector ($v_x$, $v_y$) may be determined so as to minimize the sum of squares of the weighted differences. In FIG. 10B, the numbers marked on the pixels are weight values according to the number of overlaps. Here, the highlighted 4×4 block represents the position of the subblock.

Fourth Embodiment

Unlike the third embodiment, which uses a rectangular masking window, this embodiment employs masking windows of various patterns (as illustrated in FIG. 7). Use of such masking windows reduces complexity taken to process all the pixels in the rectangular masking window.

Figure 11:
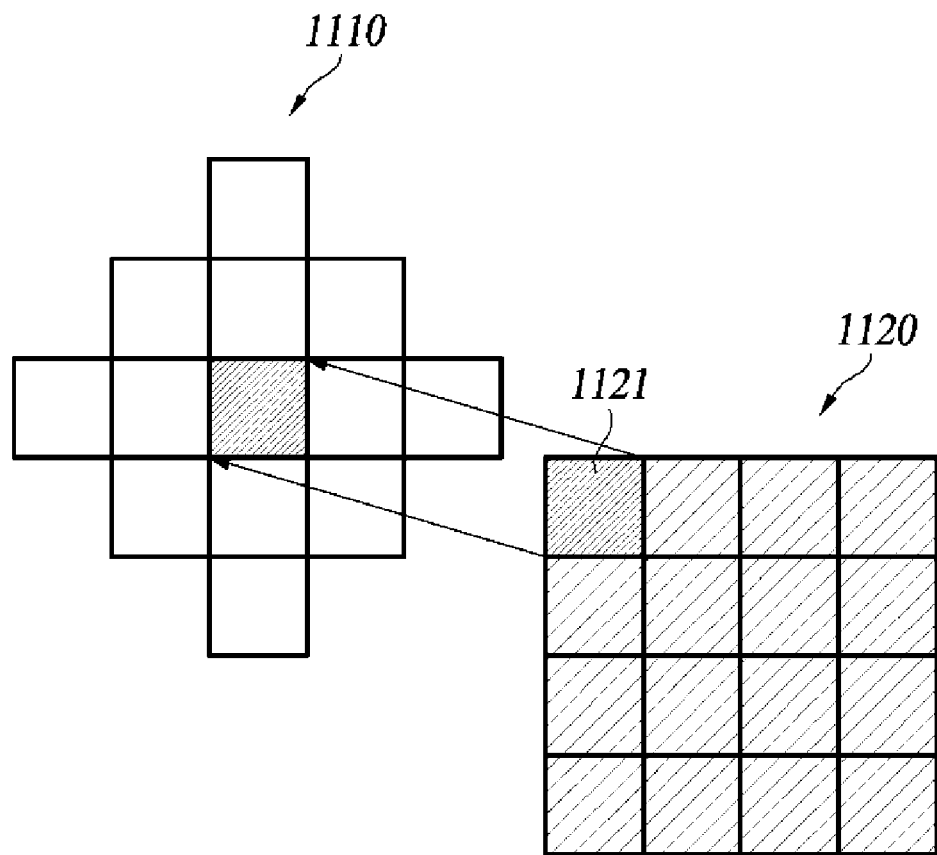
FIG. 11 is a diagram illustrating a diamond-shaped masking window and a 4×4 subblock which are used to determine a subblock-level BIO motion vector according to the fourth embodiment.

FIG. 11 illustrates a diamond type masking window 1110 and a 4×4 subblock 1120. As illustrated in FIG. 11, when a diamond-shaped masking window 1110 with M=2 is used, the total number of pixels in the masking window 1110 is 13. Therefore, the total number of differences Δ required to determine the BIO motion vector ($v_x$, $v_y$) of the subblock is 208 (=16×13). Finally, a BIO motion vector corresponding to the 4×4 block is estimated by substituting the 208 differences into Equation 2. As in the third embodiment, a weight corresponding to the number of overlaps may be assigned to the differences, and the weighted differences may be substituted into Equation 2 to estimate the BIO motion vector for the 4×4 subblock.

Fifth Embodiment

In the third and fourth embodiments, a masking window is applied to all pixels in a subblock. In contrast, in this embodiment, a masking window is applied to some pixels in the subblock.

Figure 12:
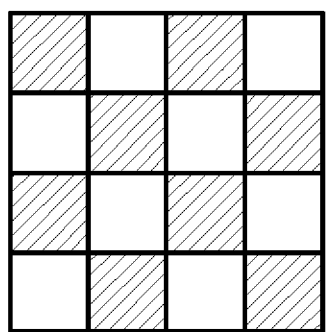
FIG. 12 is a diagram illustrating three types of positions of pixels to which a masking window is applied in a subblock according to the fifth embodiment.
Figure 12:
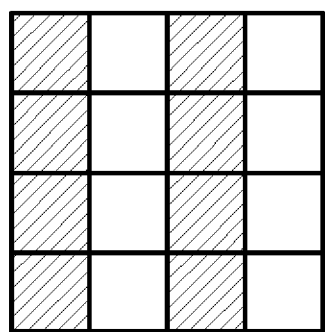
Figure 12:
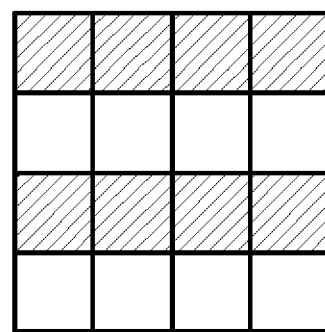

FIG. 12 is a diagram illustrating three types of positions of pixels to which a masking window is applied in a subblock. In one type, the positions of the pixels to which the masking window is applied and the pixels to which the masking window is not applied form a check pattern (see (a) of FIG. 12). In the other two types, the pixels form a pattern of horizontal stripes and a pattern of vertical stripes, respectively (see (b) and (c) of FIG. 12). The present disclosure does not exclude use of any type that samples and processes only some pixels in the subblock, other than the types illustrated in FIG. 12. Thus, in the above-described embodiments, computational complexity required to calculate the differences whose number corresponds to the masking window for all the pixels in the subblock may be reduced.

Figure 13:
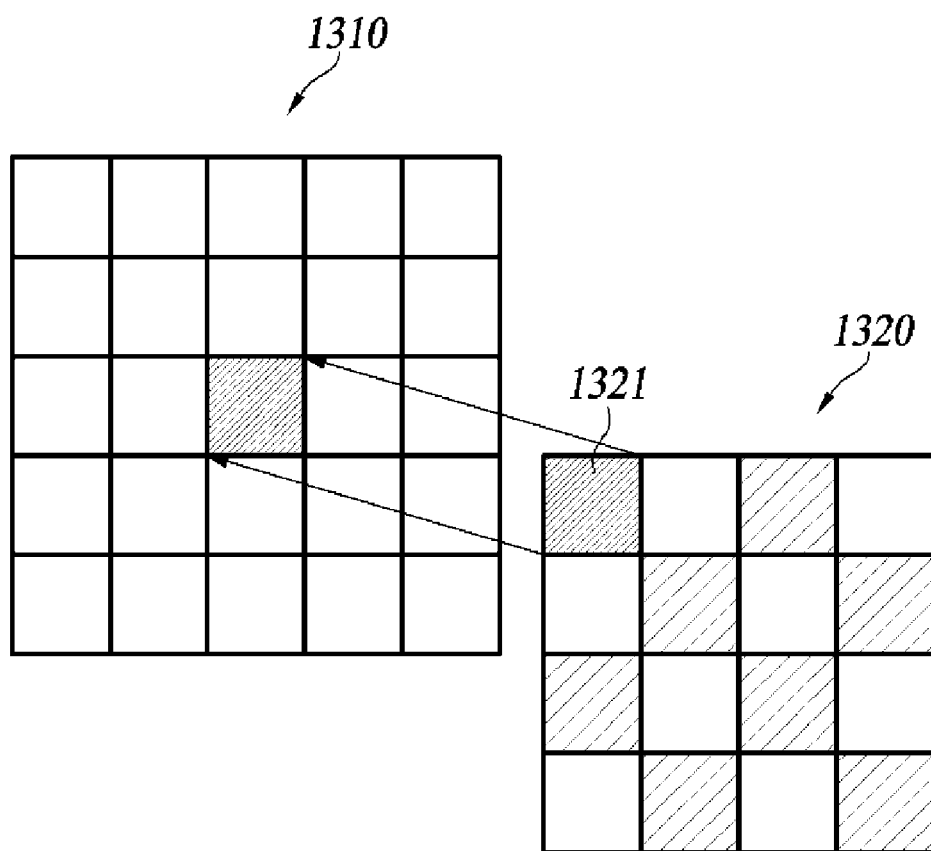
FIG. 13 is a diagram illustrating a 5×5 masking window used in determining a BIO motion vector at a subblock level and a 4×4 subblock in a check pattern obtained by sampling pixels to which the masking window is applied, according to a fifth embodiment.

In this embodiment, the total number of differences Δ required to determine the BIO motion vector of the subblock will be described with reference to FIG. 13. FIG. 13 illustrates a 5×5 square-shaped masking window 1310 and pixels of a 4×4 subblock 1320 sampled in a check pattern. The total number of pixels in the 5×5 square-shaped masking window 1310 is 25. 25 differences Δ of Equation 1 should be estimated by applying a masking window to each of the eight pixels indicated by hatching in the subblock. Therefore, the total number of differences Δ required to determine the BIO motion vectors ($v_x$, $v_y$) of the 4×4 subblock amounts to 200 (=8×25). Finally, the 200 differences are substituted into Equation 2 to estimate the BIO motion vector corresponding to the 4×4 block. As in the third embodiment, a weight corresponding to the number of overlaps may be assigned to the differences, and the weighted differences may be substituted into Equation 2 to estimate the BIO motion vector for the 4×4 subblock.

Sixth Embodiment

This embodiment is a combination of the schemes presented in the fourth and fifth embodiments. That is, this embodiment employs masking windows of various patterns other than the rectangular shape (similar to the fourth embodiment), and applies the masking window only to some sample pixels in the subblock (similar to the fifth embodiment). Therefore, the technique of this embodiment has lower calculation complexity than the fourth and fifth embodiments.

Figure 14:
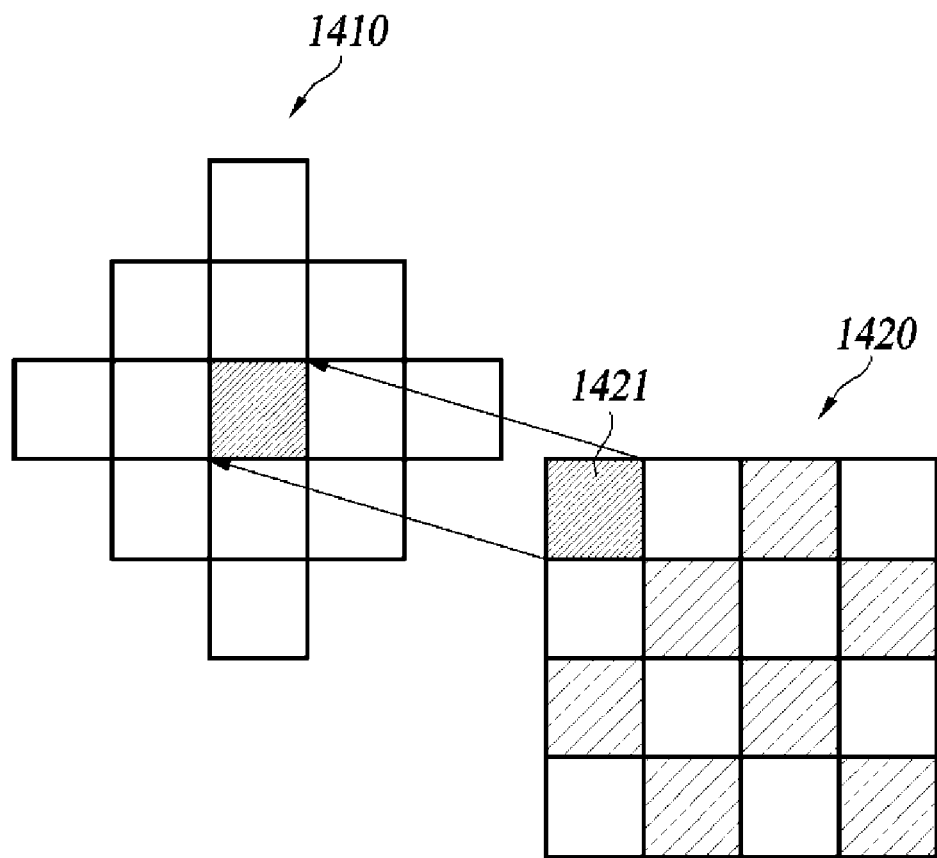
FIG. 14 is a diagram illustrating a diamond-type masking window used for BIO-based motion compensation and prediction pixels in a 4×4 subblock according to a sixth embodiment.

FIG. 14 illustrates a diamond-type masking window 1410 and sample pixels to which a BIO process is applied in a 4×4 subblock 1420 according to an example of the scheme proposed in this embodiment. In the case of FIG. 14, the total number of differences Δ required to determine a BIO motion vector ($v_x$, $v_y$) for the subblock is 104 (=8×13). Finally, the 104 differences are substituted into Equation 2 to estimate a BIO motion vector ($v_x$, $v_y$) corresponding to the 4×4 subblock. As in the third embodiment, a weight corresponding to the number of overlaps may be assigned to the differences, and the weighted differences may be substituted into Equation 2 to estimate the BIO motion vector for the 4×4 subblock.

Seventh Embodiment

In the previous embodiments, differences Δ, the number of which corresponds to the size of a masking window, are calculated for each of (all or some) pixels of a subblock. For example, in the third embodiment, the total number of differences required to determine a BIO motion vector for a 4×4 subblock using a 5×5 masking window amounts to 400 (=16×25). In contrast, this embodiment does not employ a masking window. This embodiment may be viewed as using a 1×1 masking window. That is, for each pixel in the subblock, only one difference Δ of Equation 1 is calculated. For example, the total number of differences Δ considered to estimate a BIO motion vector for the 4×4 subblock is 16. Finally, only 16 differences Δ are substituted into Equation 2 to estimate the BIO motion vector for the 4×4 subblock. That is, the BIO motion vector is calculated so as to minimize the sum of squares of the 16 differences.

Figure 15:
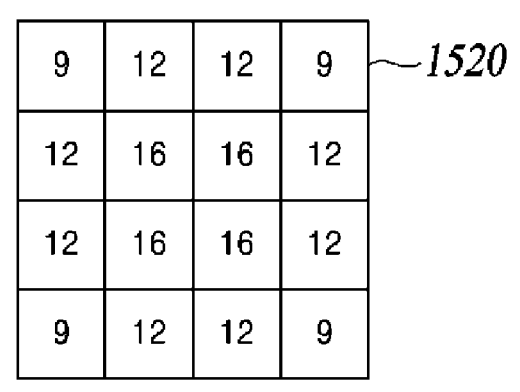

Alternatively, a BIO motion vector corresponding to the 4×4 subblock may be estimated by assigning different weights to the 16 differences and substituting the weighted differences into Equation 2. Here, a higher weight may be assigned to an area inside the subblock, and a lower weight may be assigned to a subblock edge area. FIG. 15 shows an example of assigning a weigh to each pixel of a subblock.

Eighth Embodiment

Figure 16A:
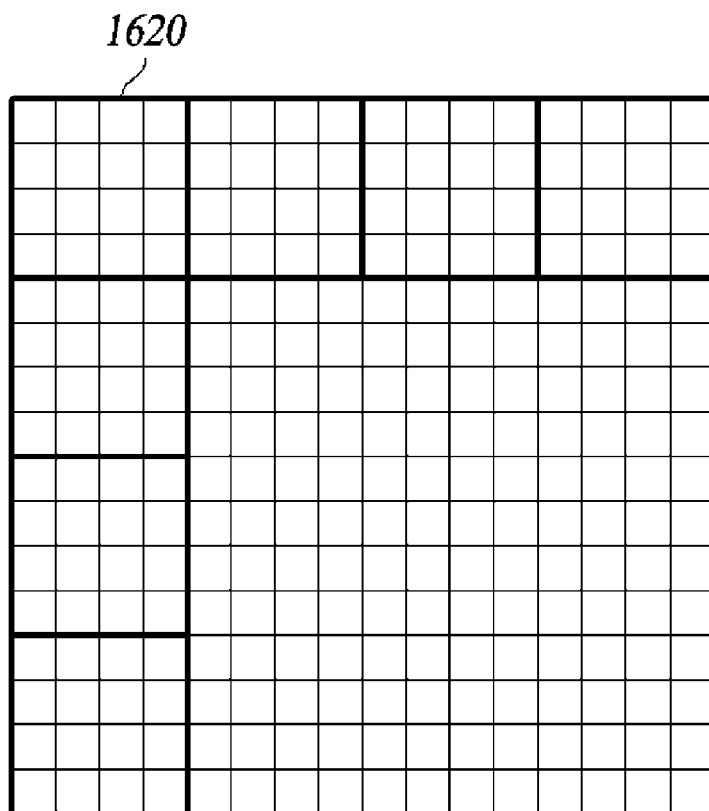
FIG. 16A illustrates subblocks located at an edge of a 16×16 current block including 16 4×4 subblocks.

In this embodiment, in determining the BIO motion vector for a subblock located at the edge of the current block, a constraint that differences Δ are not calculated in an area outside the current block is imposed. For example, suppose that the size of the current block is 16×16 and a BIO motion vector is calculated for each 4×4 subblock, as illustrated in FIG. 16A. In determining the BIO motion vectors of 12 4×4 subblocks located at the edge of the current block among the 16 4×4 subblocks, the difference Δ for a masking pixel located in an area outside the current block is not taken into account. Here, the masking pixel located in the area outside the current block may vary according to the size of the subblock and the size and position of a masking window. Therefore, in this embodiment, the number of differences Δ to be calculated to determine the BIO motion vector of a subblock may depend on the position of the corresponding subblock in the current block.

When this scheme is combined with the scheme of the third embodiment for assigning weights to overlapping differences, a weight for each masking pixel is given as shown in FIG. 16B. That is, the pixels marked with 0 in FIG. 16B are pixels located outside the current block, and differences thereof are not calculated. According to this scheme, the number of differences to be calculated is smaller than in the third embodiment. Therefore, the amount of calculation is reduced, and the memory may be saved as the values of pixels located outside the current block are not referenced.

This scheme is not limited to the case where a square masking window is used, but may be applied even to a case where masking windows of various shapes including a diamond shape and a plus shape are used.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the explicitly described above embodiments but is inclusive of the claims and equivalents thereto.

What is claimed is:

1. A method for encoding video data, comprising:
   determining a first motion vector indicating a first region corresponding to a current block in a first reference picture, and a second motion vector indicating a second region corresponding to the current block in a second reference picture;
   generating a prediction block for the current block by applying a bidirectional optical flow (BIO) process in a subblock basis;
   determining a residual block for the current block using the prediction block; and
   encoding the first motion vector, the second motion vector and the residual block for the current block in a bitstream,
   wherein the generating of the prediction block comprises:
      determining a BIO motion vector for each subblock constituting the current block; and
      generating a prediction value for each of pixels constituting a corresponding subblock based on the determined BIO motion vector,
   wherein the BIO motion vector is determined based on flow differences obtained for pixels within a square block surrounding the corresponding subblock,
   wherein the flow difference for a given pixel within the square block is calculated between a first point on the first reference picture and a second point on the second reference picture which correspond to the given pixel within the square block, and
   wherein a size of the subblock is 4×4,
   wherein the BIO motion vector is determined as a vector that minimizes a weighted sum of squares of flow differences obtained for respective pixels within the square block surrounding the corresponding subblock, and
   wherein a higher weight is assigned to a flow difference obtained for a pixel located further inside the square block surrounding the corresponding subblock.

2. A method for decoding video data, comprising:
   determining a first motion vector indicating a first region corresponding to a current block in a first reference picture, and a second motion vector indicating a second region corresponding to the current block in a second reference picture;

generating a prediction block for the current block by applying a bidirectional optical flow (BIO) process in a subblock basis; and reconstructing the current block using the prediction block, wherein the generating of the prediction block comprises:
    determining a BIO motion vector for each subblock constituting the current block; and
    generating a prediction value for each of pixels constituting a corresponding subblock based on the determined BIO motion vector, wherein the BIO motion vector is determined based on flow differences obtained for pixels within a square block surrounding the corresponding subblock, wherein the flow difference for a given pixel within the square block is calculated between a first point on the first reference picture and a second point on the second reference picture which correspond to the given pixel within the square block, wherein the reconstructing of the current block includes:
    decoding a residual block for the current block from a bitstream; and
    adding the residual block to the prediction block to reconstruct the current block, wherein a size of the subblock is 4×4, wherein the BIO motion vector is determined as a vector that minimizes a weighted sum of squares of flow differences obtained for respective pixels within the square block surrounding the corresponding subblock, and wherein a higher weight is assigned to a flow difference obtained for a pixel located further inside the square block surrounding the corresponding subblock.

3. A non-transitory computer readable medium storing a bitstream containing encoded data for video data, the bitstream generated by processes of:

determining a first motion vector indicating a first region corresponding to a current block in a first reference picture, and a second motion vector indicating a second region corresponding to the current block in a second reference picture;

generating a prediction block for the current block by applying a bidirectional optical flow (BIO) process in a subblock basis;

determining a residual block for the current block using the prediction block; and encoding the first motion vector, the second motion vector and the residual block for the current block in the bitstream, wherein the generating of the prediction block comprises:
    determining a BIO motion vector for each subblock constituting the current block; and
    generating a prediction value for each of pixels constituting a corresponding subblock based on the determined BIO motion vector, wherein the BIO motion vector is determined based on flow differences obtained for pixels within a square block surrounding the corresponding subblock, wherein the flow difference for a given pixel within the square block is calculated between a first point on the first reference picture and a second point on the second reference picture which correspond to the given pixel within the square block, wherein a size of the subblock is 4×4, wherein the BIO motion vector is determined as a vector that minimizes a weighted sum of squares of flow differences obtained for respective pixels within the square block surrounding the corresponding subblock, and wherein a higher weight is assigned to a flow difference obtained for a pixel located further inside the square block surrounding the corresponding subblock.

* * * * *